US012089303B2

(12) United States Patent
Borra et al.

(10) Patent No.: US 12,089,303 B2
(45) Date of Patent: Sep. 10, 2024

(54) DETERMINING A LIGHT EFFECT BASED ON A DEGREE OF SPEECH IN MEDIA CONTENT

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL); Antonie Leonardus Johannes Kamp, San Francisco, CA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 298 days.

(21) Appl. No.: 17/299,482

(22) PCT Filed: Jan. 9, 2020

(86) PCT No.: PCT/EP2020/050408
§ 371 (c)(1),
(2) Date: Jun. 3, 2021

(87) PCT Pub. No.: WO2020/144265
PCT Pub. Date: Jul. 16, 2020

(65) Prior Publication Data

US 2022/0053618 A1 Feb. 17, 2022

Related U.S. Application Data

(60) Provisional application No. 62/790,219, filed on Jan. 9, 2019.

(30) Foreign Application Priority Data

Jan. 25, 2019 (EP) .................................... 19153773

(51) Int. Cl.
*H05B 45/20* (2020.01)
*H05B 47/12* (2020.01)
(Continued)

(52) U.S. Cl.
CPC ............ *H05B 45/20* (2020.01); *H05B 47/12* (2020.01); *H05B 47/155* (2020.01); *A63J 17/00* (2013.01); *G10L 25/48* (2013.01); *G10L 25/78* (2013.01)

(58) Field of Classification Search
CPC ...... H05B 47/00; H05B 47/105; H05B 47/11; H05B 47/12; H05B 47/155; H05B 45/12;
(Continued)

(56) References Cited

U.S. PATENT DOCUMENTS

| | | | | |
|---|---|---|---|---|
| 11,308,333 | B1 * | 4/2022 | Langford | G06V 20/52 |
| 2002/0044066 | A1 | 4/2002 | Dowling et al. | |

(Continued)

FOREIGN PATENT DOCUMENTS

| | | | |
|---|---|---|---|
| CN | 107509287 | A | 12/2017 |
| WO | 2007119277 | A1 | 10/2007 |

OTHER PUBLICATIONS

NPL Search (Jun. 23, 2023).*

*Primary Examiner* — Van T Trieu

(57) ABSTRACT

A method comprises obtaining (101) media content information and obtaining (103, 109) information indicating a degree of speech in the audio portion. The media content information comprises the media content and/or information determined by analyzing the media content and the degree of speech is determined based on an analysis of an audio portion of the media content. The method further comprises determining (107, 113) an extent to which the audio portion should be used to determine one or more light effects to be rendered while the media content is being rendered and determining (117) these light effects. The extent is determined based on the degree of speech and the light effects are determined based on an analysis (115) of the audio portion
(Continued)

in dependence on the extent and based on an analysis of a video portion of the media content.

12 Claims, 9 Drawing Sheets

(51) Int. Cl.

| | |
|---|---|
| ***H05B 47/155*** | (2020.01) |
| *A63J 17/00* | (2006.01) |
| *G10L 25/48* | (2013.01) |
| *G10L 25/78* | (2013.01) |

(58) Field of Classification Search
CPC ...... H05B 45/20; H04W 76/00; H04W 76/02; F21V 14/00; F21V 14/02; A63J 17/00; G08B 13/196
See application file for complete search history.

(56) References Cited

U.S. PATENT DOCUMENTS

| | | | | |
|---|---|---|---|---|
| 2008/0027728 | A1* | 1/2008 | Luckett | G10L 25/78 704/E11.003 |
| 2010/0071535 | A1 | 3/2010 | McKinney et al. | |
| 2010/0265414 | A1 | 10/2010 | Nieuwlands | |
| 2014/0056172 | A1* | 2/2014 | Lee | H04B 10/116 370/254 |
| 2014/0149117 | A1* | 5/2014 | Bakish | G10L 15/24 704/248 |
| 2018/0061438 | A1 | 3/2018 | Love et al. | |
| 2021/0112647 | A1* | 4/2021 | Coleman | H05B 45/12 |

* cited by examiner

500

DETERMINING A LIGHT EFFECT BASED ON A DEGREE OF SPEECH IN MEDIA CONTENT

CROSS-REFERENCE TO PRIOR APPLICATIONS

This application is the U.S. National Phase application under 35 U.S.C. § 371 of International Application No. PCT/EP2020/050408, filed on Jan. 9, 2020, which claims the benefit of U.S. Provisional Patent Application No. 62/790,219, filed on Jan. 9, 2019 and European Patent Application No. 19153773.7, filed on Jan. 25, 2019. These applications are hereby incorporated by reference herein.

FIELD OF THE INVENTION

The invention relates to a system for determining one or more light effects to be rendered while media content is being rendered, said one or more light effects being determined based on an analysis of said media content.

The invention further relates to a method of determining one or more light effects to be rendered while media content is being rendered, said one or more light effects being determined based on an analysis of said media content.

The invention also relates to a computer program product enabling a computer system to perform such a method.

BACKGROUND OF THE INVENTION

The versatility of connected light systems such as Philips Hue keeps growing, offering more and more features to the users. These new features include context awareness, smart automated behavior, new forms of light usage such as entertainment, and so on. For example, Hue entertainment enhances the experience of watching a movie, listening to a music and/or playing a game by using light scripts or by creating light effects based on audio and/or video analysis. The latter is realized with the Hue entertainment application HueSync, which automatically creates light effects using color extraction algorithms.

An ideal lighting system used for entertainment supports and enhances the experience of specific content. Currently, there is a focus on low-level image statistics such as color values and image motion. However, these statistics do not take the semantic dimension of a scene into account. Two scenes that are statistically virtually identical, could convey vastly different meanings.

Without context, it is not possible to judge the semantic (intended) meaning of an image of an empty bench in a field of grass, it could be an image intended to convey a nice summer's day or a walk in the park with family, for example. However, when one takes into account that the source of the image is a funeral home, the image takes on a different dimension, perhaps one of sadness, or sorrow. Rendering light effects based on media content without the context of the media content regularly results in suboptimal light effects.

WO 2007/119277A1 discloses a device that controls a light device to render light effects while video is being rendered and that takes into account the context of the video in the form of the genre of the video. Specifically, WO 2007/119277A1 discloses an illumination control data generating unit which generates illumination control data to control an illumination device such that it emits illumination light according to the genre, e.g. music program, sports events, etc., and feature value of the video data displayed on a display device. The illumination device emits the illumination light constantly when the displayed video is of a predetermined genre regardless of the feature value.

It is a drawback of WO 2007/119277 A1 that by only taking into account the genre of the video, the rendered light effects are still suboptimal.

SUMMARY OF THE INVENTION

It is a first object of the invention to provide a system, which is able to determine one or more light effects while taking into account the context of the media content in a better manner in order to create more suitable light effects.

It is a second object of the invention to provide a method, which is able to determine one or more light effects while taking into account the context of the media content in a better manner in order to create more suitable light effects.

In a first aspect of the invention, a system for determining one or more light effects to be rendered while media content is being rendered, said one or more light effects being determined based on an analysis of said media content, comprises at least one input interface, at least one output interface, and at least one processor configured to use said at least one input interface to obtain media content information, said media content information comprising said media content and/or information determined by analyzing said media content, and obtain information indicating a degree of speech in said audio portion, said degree of speech being determined based on an analysis of an audio portion of said media content.

The at least one processor is further configured to determine an extent to which said audio portion should be used to determine one or more light effects, said extent being determined based on said determined degree of speech, determine one or more light effects to be rendered on one or more light sources while media content is being rendered, said one or more light effects being determined based on an analysis of said audio portion in dependence on said extent and being determined at least based on an analysis of a video portion of said media content, and use said at least one output interface to control said one or more light sources to render said one or more light effects and/or output a light script specifying said one or more light effects.

By using the degree of speech as indicator of the semantic meaning of a scene, the context of the media content may be taken into account in a better manner in order to create more suitable light effects. Even when only the spectral composition of speech is taken into account, this may still be highly informative as to the semantic meaning of a scene, e.g. whispering vs screaming or laughing vs crying. A scene that contains a lot of dialogue will typically benefit more from subtle lighting effects than a scene that is visually similar (with regards to overall scene dynamics, saturation and color), but does not comprise a lot of dialogue.

Said degree of speech may comprise an amount of speech and/or one or more classes of speech, for example. Said system may be part of a lighting system which comprises one or more devices or may be used in a lighting system which comprises one or more lighting devices, for example.

Said extent may indicate whether a brightness and/or chromaticity of said one or more light effects should be determined based on an intensity and/or a loudness of said audio portion. Varying the brightness and/or chromaticity of light effects based on the intensity and/or loudness of the audio portion of the media content item is especially beneficial for music video clips and scenes with sound effects such as explosions, but not appropriate for scenes with a lot of dialogue. The intensity of the audio is typically the power carried by sound waves per unit area in a direction perpendicular to that area. The loudness of the audio is typically the subjective perception of sound pressure.

As a first example, a light effect with a high brightness may be rendered alongside a piece of the audio portion that has a high intensity and/or loudness and a light effect with a low brightness may be rendered alongside a piece of the audio portion that has a low intensity and/or loudness. As a second example, a light effect with a saturated color may be rendered alongside a fragment of the audio portion that has a high intensity and/or loudness and a light effect with a desaturated color may be rendered alongside a fragment of the audio portion that has a low intensity and/or loudness.

Alternatively or additionally, said extent may indicate whether a brightness and/or chromaticity of said one or more light effects should be determined based on one or more different characteristics of said audio portion. The degree of speech is normally determined based on characteristics other than audio intensity and/or loudness. The brightness and/or chromaticity of the light effects may also be varied based on these other characteristics, e.g. based on perceived emotions determined from narration and/or singing. Perceived emotions may be determined, for example, as described in Proceedings of the ISCA Workshop on Speech and Emotion, <https://www.isca-speech.org/archive_open/speech_emotion/spem.pdf>.

Said degree of speech in said audio portion may be determined by determining an amount of speech in said audio portion and classifying said audio portion as predominantly speech or predominantly non-speech based on said amount of speech. This classification may be used as described in the next two paragraphs.

Said at least one processor may be configured to determine a first extent as said extent in dependence on said audio portion being classified as predominantly speech and determine a second extent as said extent in dependence on said audio portion being classified as predominantly non-speech, said second extent indicating that a brightness and/or chromaticity of said one or more light effects should be determined based on an intensity and/or loudness of said audio portion and said first extent indicating that a brightness and/or chromaticity of said one or more light effects should not be determined based on an intensity and/or loudness of said audio portion. Varying the brightness and/or chromaticity of light effects based on the intensity and/or loudness of the audio portion of the media content item is especially beneficial for music video clips and scenes with sound effects such as explosions, but not appropriate for scenes with a lot of dialogue.

Said at least one processor may be configured to determine said one or more light effects using a first brightness and/or chromaticity range in dependence on said audio portion being classified as predominantly speech and using a second brightness and/or chromaticity range in dependence on said audio portion being classified as predominantly non-speech, said first brightness and/or chromaticity range having a lower average brightness and/or chromaticity than said second brightness and/or chromaticity range. Typically, scenes classified as predominantly speech focus on dialogue and these scenes preferably use lower intensity light scenes than scenes classified as predominantly non-speech, which typically focus on visual aspects, in order not to distract from the dialogue.

Said degree of speech in said audio portion may be determined by classifying said audio portion as diegetic sound or non-diegetic sound. Non-diegetic sound is typically defined as sound coming from a source outside story space, e.g. narrator's commentary, sound effects which is added for the dramatic effect, mood music. Diegetic sound is typically defined as sound whose source is visible on the screen or whose source is implied to be present by the action of the film, e.g. voices of characters, sounds made by objects in the story, music coming from instruments in the story. This classification is typically difficult to detect from audio and may therefore be included manually in content metadata. It may sometimes be possible to detect if the source of the speech/sound in the audio portion is on the screen or off screen and influence the light effects accordingly.

When the speech in the audio portion is classified as diegetic or non-diegetic, this may be used to determine light effects based on audio analysis (and optionally video analysis) if the speech is classified as non-diegetic and based on only video analysis if the speech is classified as diegetic. The diegetic/non-diegetic classification may also be useful, for example, to distinguish a theme song playing for mood effect (non-diegetic) from a song that is part of the movie, e.g. being listened to by characters in a club (diegetic). In the former case, the light effects may be determined based on only video analysis, for example. In the latter case, the light effects may be determined based on audio analysis (e.g. help to create being in a club feeling), for example.

Said degree of speech in said audio portion may be determined by classifying said audio portion as a class of a plurality of classes, said plurality of classes comprising at least two of: conversation, whispering, screaming, narration and singing. This classification may be used as described in the next two paragraphs.

Said at least one processor may be configured to determine a first extent as said extent in dependence on said audio portion being classified as conversation and determine a second extent as said extent in dependence on said audio portion being classified as singing, said second extent indicating that a brightness and/or chromaticity of said one or more light effects should be determined based on an intensity and/or loudness of said audio portion and said first extent indicating that a brightness and/or chromaticity of said one or more light effects should not be determined based on an intensity and/or loudness of said audio portion. In the case that the audio portion is classified as singing (instead of as conversation), normal light effects may be rendered, i.e. light effects are determined based on an analysis of the audio portion. This is beneficial, for example, if a music video clip is classified as predominantly speech due to the presence of singing or if an audio portion is not classified as either predominantly speech or predominantly non-speech.

Said one or more light effects may comprise a plurality of light effects and said at least one processor may be configured to determine a speed of transitions between said plurality of light effects in dependence on said class. For example, the dynamics of the light effects may be adjusted to high if the audio portion is classified as screaming, to medium if the audio portion is classified as conversation and to low if the audio portion is classified as whispering. The same transition speed may be used to transition between different chromaticity settings and to transition between different brightness settings, but different transitions speeds could alternatively be used.

Said audio portion may be classified by analyzing a spectral composition of said audio portion. For example, by considering the spectral and intensity difference between casual speech and shouted speech it is possible to determine whether persons are talking at conversational levels or screaming.

Said one or more light effects comprise a plurality of light effects and said at least one processor may be configured to determine whether an amount of speech in said audio portion exceeds a threshold and determine a speed of transitions between said plurality of light effects in dependence on said amount of speech exceeding said threshold. For examples, a scene comprising a lot of conversation may be rendered using low dynamics, whereas the same scene with a lot of screaming, even though the audio portion of this scene may have an identical intensity and/or loudness, may be rendered at higher dynamics. The same transition speed may be used to transition between different chromaticity settings and to transition between different brightness settings, but different transitions speeds could alternatively be used.

Said at least one processor may be configured to determine words spoken in said audio portion by recognizing said spoken words in said audio portion and/or obtaining said spoken words from subtitles associated with said media content. Words spoken in the audio portion may be used to determine a mood of a scene more precisely. As a first example, highly dynamic light effects may be rendered for scenes that are emotionally charged and slightly dynamic light effects may be rendered for scenes that are not emotionally charged. As a second example, rendering light effects with jubilant green colors during a funeral scene might be inappropriate. Instead, a more subdued desaturated green might be more applicable.

Said at least one processor may be configured to determine said degree of speech by using subtitles associated with said media content and/or by focusing on a center channel in or obtained from said audio portion. Since the center channel in a surround setup normally comprises the dialogues, this is the best channel to focus on for determining an amount of speech and/or recognizing spoken words. Although a stereo audio portion might not comprise a center channel, such a center channel may then be obtained from the audio portion by determining the common components in the two stereo channels. The size of, or quantity of words in, a subtitle file may be a good indicator of the amount of speech in the media content.

In a second aspect of the invention, a method of determining one or more light effects to be rendered while media content is being rendered, said one or more light effects being determined based on an analysis of said media content, comprises obtaining media content information, said media content information comprising said media content and/or information determined by analyzing said media content, and obtaining information indicating a degree of speech in said audio portion, said degree of speech being determined based on an analysis of an audio portion of said media content.

Said method further comprises determining an extent to which said audio portion should be used to determine one or more light effects, said extent being determined based on said determined degree of speech, determining one or more light effects to be rendered on one or more light sources while media content is being rendered, said one or more light effects being determined based on an analysis of said audio portion in dependence on said extent and being determined at least based on an analysis of a video portion of said media content, and controlling said one or more light sources to render said one or more light effects and/or outputting a light script specifying said one or more light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations for determining one or more light effects to be rendered while media content is being rendered, said one or more light effects being determined based on an analysis of said media content. The executable operations comprise obtaining media content information, said media content information comprising said media content and/or information determined by analyzing said media content, and obtaining information indicating a degree of speech in said audio portion, said degree of speech being determined based on an analysis of an audio portion of said media content.

The executable operations further comprise determining an extent to which said audio portion should be used to determine one or more light effects, said extent being determined based on said determined degree of speech, determining one or more light effects to be rendered on one or more light sources while media content is being rendered, said one or more light effects being determined based on an analysis of said audio portion in dependence on said extent and being determined at least based on an analysis of a video portion of said media content, and controlling said one or more light sources to render said one or more light effects and/or outputting a light script specifying said one or more light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like, conventional procedural programming languages, such as the "C" programming language or similar programming languages, and functional programming languages such as Scala, Haskel or the like. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
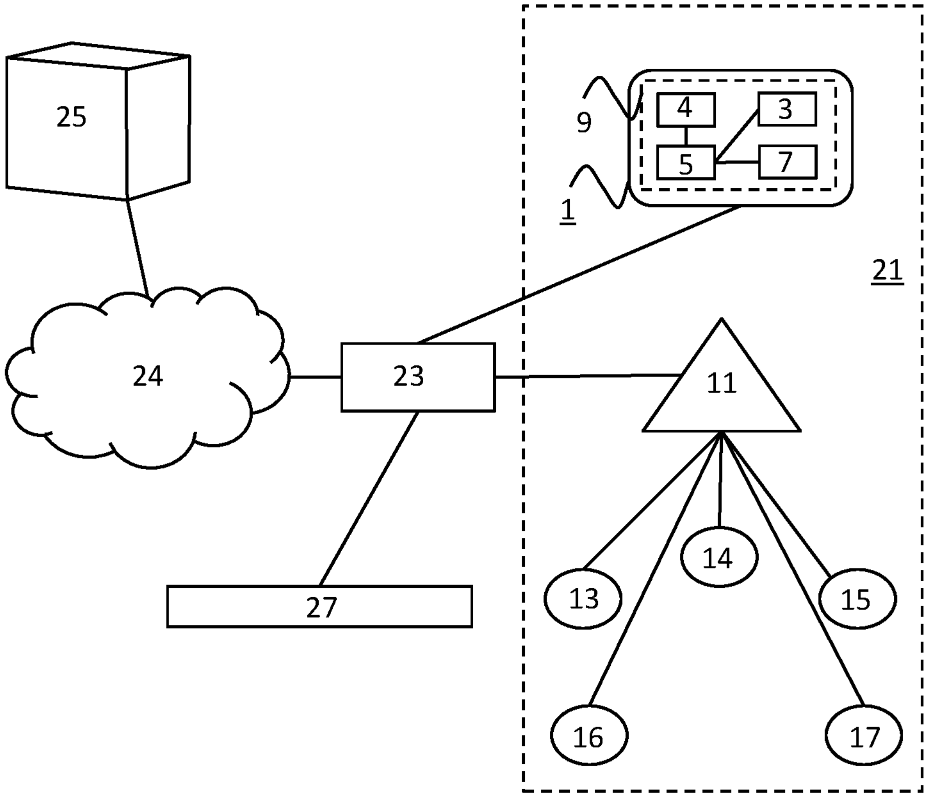
FIG. 1 is a block diagram of an embodiment of the system.

FIG. 1 shows an embodiment of the system for determining one or more light effects to be rendered while media content is being rendered: mobile device 1. The one or more light effects are determined based on an analysis of the media content. This analysis may be performed by the mobile device 1 or by another device. Mobile device 1 is connected to a wireless LAN access point 23. A bridge 11 is also connected to the wireless LAN access point 23, e.g. via Ethernet. Light sources 13-17 communicate wirelessly with the bridge 11, e.g. using the Zigbee protocol, and can be controlled via the bridge 11, e.g. by the mobile device 1. The bridge 11 may be a Philips Hue bridge and the light sources 13-17 may be Philips Hue lights, for example. In an alternative embodiment, light sources are controlled without a bridge.

A TV 27 is also connected to the wireless LAN access point 23. Media content may be rendered by the mobile device 1 or by the TV 27, for example. The wireless LAN access point 23 is connected to the Internet 24. An Internet server 25 is also connected to the Internet 24. The mobile device 1 may be a mobile phone or a tablet, for example. The mobile device 1 may run the Philips Hue Sync app, for example. The mobile device 1 comprises a processor 5, a receiver 3, a transmitter 4, a memory 7, and a display 9. In the embodiment of FIG. 1, the display 9 comprises a touchscreen. The mobile device 1, the bridge 11 and the light sources 13-17 are part of lighting system 21.

In the embodiment of FIG. 1, the processor 5 is configured to use the receiver 4 to obtain media content information. The media content information comprises the media content and/or information determined by analyzing the media content. The media content information may be obtained from the Internet server 25, for example. The processor 5 is further configured to obtain information indicating a degree of speech in the audio portion. This information may be obtained from the media content information, for example. The degree of speech is determined based on an analysis of an audio portion of the media content. The processor 5 is further configured to determine an extent to which the audio portion should be used to determine one or more light effects. The extent is determined based on the determined degree of speech.

The processor 5 is further configured to determine one or more light effects to be rendered on one or more light sources, e.g. one or more of light sources 13-17 or not yet identified light sources, while media content is being rendered. The one or more light effects are determined based on an analysis of the audio portion in dependence on the extent and determined at least based on an analysis of a video portion of the media content. The processor 5 is further configured to use the transmitter 4 to control one or more of light sources 13-17 to render the one or more light effects and/or use an internal interface (not shown) to output a light script specifying the one or more light effects to memory 7.

The extent may indicate whether a brightness and/or chromaticity of the one or more light effects should be determined based on an intensity and/or a loudness of the audio portion, for example. Depending on the algorithm used for light effects creation, different ways of applying the speech classification could be envisioned:

Transition speed. If colors for light effects creation are extracted from predefined analysis areas within the on-screen content (as is done in HueSync, for example), speech classification can then be used to influence the transition speed between the light effects rendering extracted colors.

Chromaticity. Colors extracted from the screen when translated to light effects may be desaturated to more pastel colors or saturated to more vibrant colors.

Brightness. Like the above, but instead of saturation, brightness may be adapted.

Extraction algorithm. Instead of modifying colors extracted from the on-screen, speech classification could control what algorithm is used to select colors, what colors are selected, and from which analysis areas.

Audio input: Often, the main way of selecting the intensity and chromaticity of the light is based on the video signal intensity and chromaticity. However, on top of that, often some additional intensity (i.e. brightness) modulation is added based on the audio intensity and/or loudness. This will make certain effects such as explosions extra dramatic by intensifying the effect or providing any effect at all (as they may be detectable on the audio but not in the video). However, with speech it is clear that such intensity variation based on the audio signal is very much unwanted. So, this audio input will then be enabled/disabled depending on whether speech is detected.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 23, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The display 9 may comprise an LCD or OLED panel, for example. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. a PC or a video module, or comprises multiple devices. The video module may be a dedicated HDMI module that can be put between the TV and the device providing the HDMI input so that it can analyze the HDMI input, for example.

In the embodiment of FIG. 1, the system of the invention is used in a lighting system to illustrate that the system can be used both for creating light scripts and for real-time rendering of light effects. However, the system is not necessarily part of a lighting system. For example, the system may be a PC that is only used for creating light scripts. In this case, the light effects are typically not created for specific light sources. A light effect may be created for one or more light sources in a certain part of a room (e.g. left of the TV) or for any light source.

In the embodiment of FIG. 1, the light sources in the lighting system may be used for real-time rendering of light effects during normal use of the lighting system or may be used for testing a light script. A light script may also be tested if the system of the invention is not used in a lighting system. In this case, the one or more light sources may be virtual/simulated. The bridge and communication between devices may be simulated as well. Furthermore, the rendering of the media content does not require a TV. For example, the media content may be rendered on the PC that is used for creating the light script, e.g. for testing purposes. The PC may, for example, run software like Adobe Premier and the user might get an extra window displaying a virtual environment with lights, or an even simpler representation to show how effects would look like if parameters are adjusted in a certain way.

Figure 2:
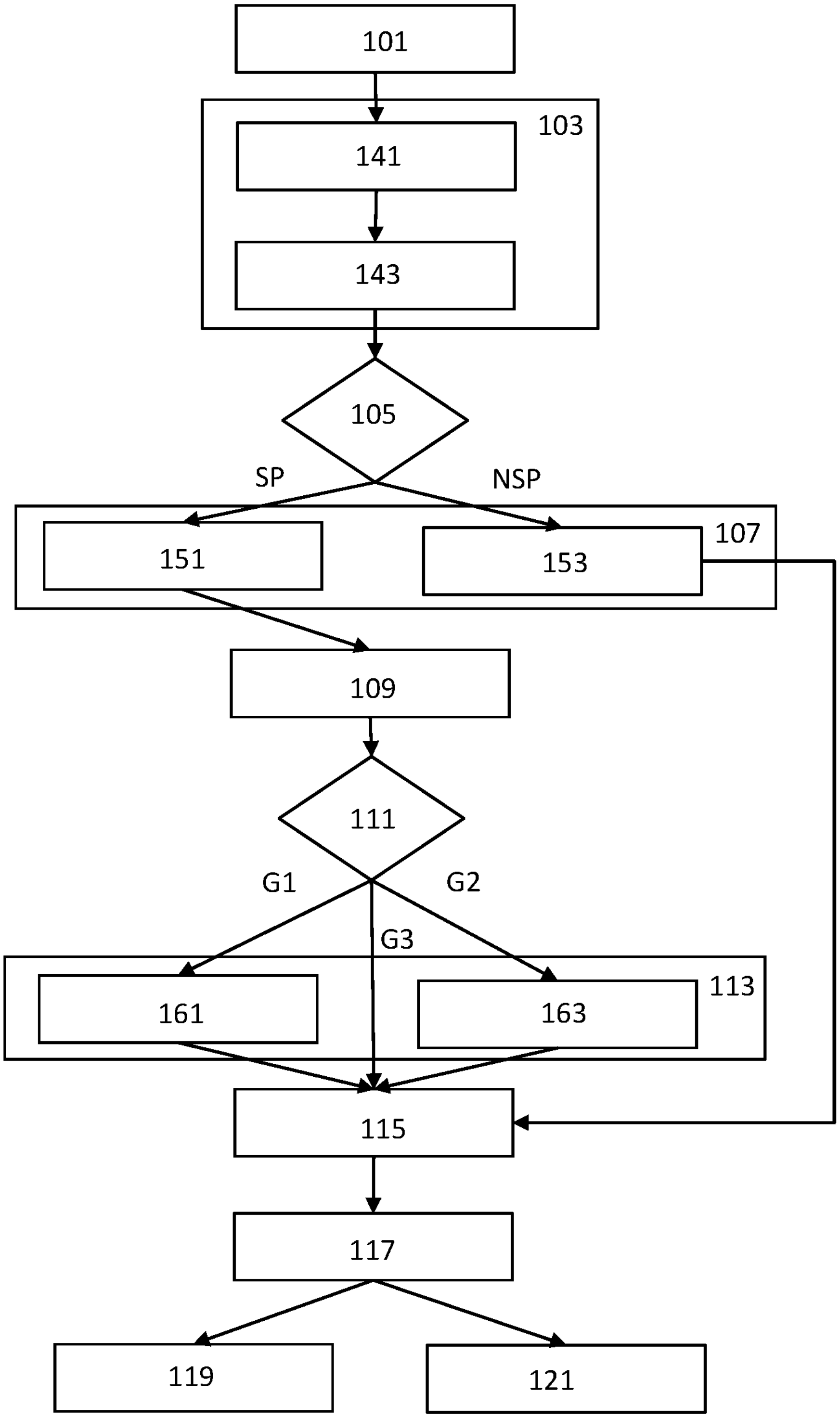
FIG. 2 is a flow diagram of a first embodiment of the method.

A first embodiment of the method is shown in FIG. 2. The method is used for determining one or more light effects to be rendered while media content is being rendered. The one or more light effects are determined based on an analysis of the media content. In the embodiment of FIG. 2, the one or more light effects comprise a plurality of light effects. A step 101 comprises obtaining media content information. The media content information comprises the media content and/or information determined by analyzing the media content.

Steps 103 and 109 comprises obtaining information indicating a degree of speech in the audio portion. The degree of speech is determined based on an analysis of an audio portion of the media content. Steps 107 and 113 comprise determining an extent to which the audio portion should be used to determine one or more light effects. The extent is determined based on the degree of speech determined in steps 103 and 109.

In the embodiment of FIG. 2, step 103 comprise sub steps 141 and 143. Step 141 comprises determining an amount of speech in the audio portion. In the embodiment of FIG. 2, this is realized by spectrally analyzing the audio portion, focusing on frequency regions typical of human speech (i.e. from approximately 300 to 3400 Hz). Speech detection may be further enhanced by e.g. detecting subtitles in the content, or by focusing on the center channel in or obtained from the audio portion. An audio portion comprising a center channel is typically rendered in a surround sound setup. Additionally, online subtitle repositories may contain timestamps for scenes that contain speech and this information may be used to further optimize the speech detection.

Step 143 comprises classifying the audio portion as predominantly speech or predominantly non-speech based on the amount of speech by determining whether there is speech in more than 50% of the audio portion. Next, a step 105 is performed. Step 105 comprises determining whether the audio portion has been classified as predominantly speech or as predominantly non-speech. If the audio portion has been classified as predominantly speech, step 151 is performed. If the audio portion has been classified as predominantly non-speech, step 153 is performed. Steps 151 and 153 are sub steps of step 107.

Step 151 comprises determining a first extent. The first extent indicates that a brightness and/or chromaticity of the one or more light effects should not be determined based on an intensity and/or loudness of the audio portion and that the one or more light effects should use a first brightness and/or chromaticity range. Step 109 is performed after step 151. Step 153 comprises determining a second extent. The second extent indicates that a brightness and/or chromaticity of the one or more light effects should be determined based on an intensity and/or loudness of the audio portion and that the one or more light effects should use a second brightness and/or chromaticity range. The first brightness and/or chromaticity range has a lower average brightness and/or chromaticity than the second brightness and/or chromaticity range. Step 115 is performed after step 153.

Step 109 comprises classifying the audio portion as a class of a plurality of classes. The plurality of classes comprises at least two of: conversation, whispering, screaming, narration and singing. In the embodiment of FIG. 2, the audio portion is classified by analyzing a spectral composition of the audio portion. Thus, the differences in spectral composition are used to determine what the appropriate behavior of a dynamic lighting system could be. By considering the spectral and intensity difference between casual speech and shouted speech it is possible to determine whether persons are talking at conversational levels or screaming. This will result in a lighting system that is able to support and enhance content in a manner that is coincident with the meaning and semantics of the content.

Next, a step 111 comprises determining in which class said audio portion has been classified and steps 161 and 162 comprise determining a speed of transitions between the plurality of light effects in dependence on this class. Step 161 is performed if the audio portion is classified as conversation or whispering (group 1). Step 163 is performed if the audio portion is classified as screaming (group 3). The extent determined in step 151 is not modified if the audio portion is classified differently (group 3). In this case, step 115 is performed after step 111. A scene comprising a lot of conversation or a mother whispering to her baby is rendered using low dynamics as indicated in the extent determined in step 161, whereas the same scene with a lot of screaming or a couple having a shouting argument, even though the audio portion of this scene may have an identical intensity and/or loudness, is rendered at higher dynamics as indicated in the extent determined in step 163.

After the extent has been determined, i.e. one of steps 151 and 153 has been performed and one of steps 161 and 163 has been performed conditionally, step 115 is performed. Step 115 comprises analyzing the video portion of the media content, e.g. by performing color extraction, and analyzing the audio portion of the media content if step 153 has been performed.

Thus, the outcome of step 143 is that either 1) the audio is predominantly speech, or 2) the audio is predominantly non-speech. Based on this classification, the first level of light effect dynamics adjustment is made in steps 151 and 153. In general, scenes which focus on dialogue should result in lower intensity light effects than scenes with focus on visual aspects (otherwise the light effects may actually distract from the dialogue). Moreover, the dynamics of the audio signal for speech, should not be considered as an input for modulating the light effect intensity, whereas for non-speech this may well be more appropriate. If it is determined in step 105 that the audio portion has been classified as speech, the spectral content is further analyzed and classified in multiple categories in step 109, e.g. conversation, whispering and screaming. Based on this classification, the dynamics of the system is further adjusted in steps 161 and 163.

A step 117 comprises determining one or more light effects to be rendered on one or more light sources while the media content is being rendered. The one or more light effects are determined based on the analysis of the audio portion performed in step 115 if step 153 has been performed, but they are at least determined based on the analysis of the video portion performed in step 115. A step 119 comprises controlling the one or more light sources to render the one or more light effects. A step 121 comprises outputting a light script specifying the one or more light effects.

In this way, the method optimizes the behavior of the dynamic lighting system based on spectral analysis of audio content. Low-level spectral analysis allows for identifying speech characteristics, such as ‘regular’ conversations, whispering, screaming etc. The system will then use and apply this information to adaptively alter the dynamics of the lights, to correspond with the scene content. Thus, the system enhances media content by adjusting the lights in a meaningful manner, corresponding to the semantics of the content.

Figure 3:
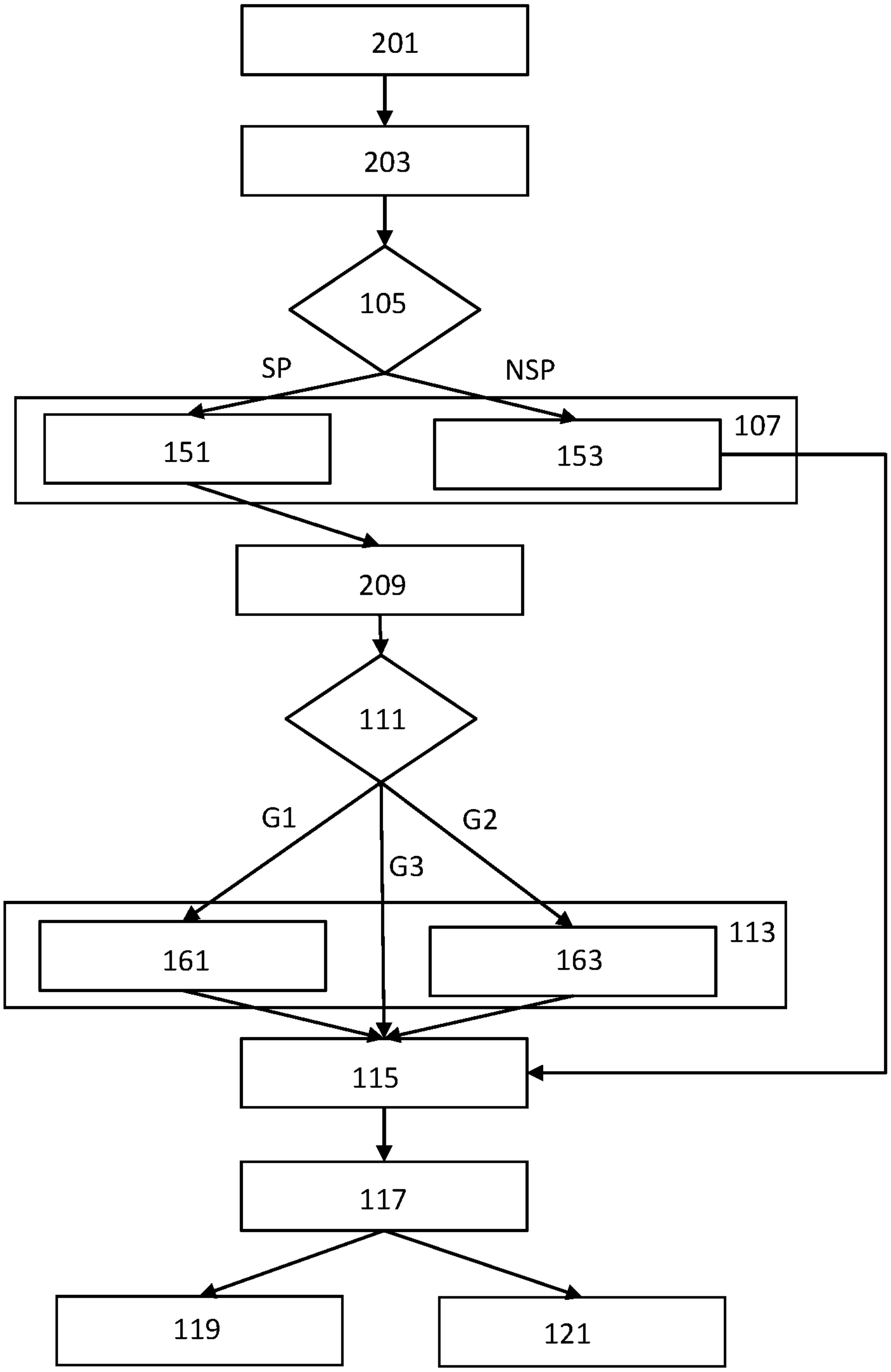
FIG. 3 is a flow diagram of a second embodiment of the method.

A second embodiment of the method is shown in FIG. 3. In the embodiment of FIG. 3, step 101 of FIG. 2 has been replaced with step 201, step 103 of FIG. 2 has been replaced with step 203, and step 109 of FIG. 2 has been replaced with step 209. Step 201 differs from step 101 in that not only the media content itself is obtained, but also metadata associated with the media content. Like steps 103 and 109, steps 203 and 209 comprise obtaining information indicating a degree of speech in the audio portion. However, in steps 203 and 209, this information is not obtained by analyzing the media content, but from the metadata. The metadata may comprise one or more classifications and/or amounts of speech and/or spectral analysis information per time interval of the media content.

In the embodiment of FIG. 3, step 203 comprises determining from the metadata whether the (current) audio portion is predominantly speech or predominantly non-speech. Step 209 comprises determining from the metadata whether the (current) audio portion belongs to one or more of a plurality of classes that includes at least two of: conversation, whispering, screaming, narration and singing. The audio portion may also be classified into non-speech classes, e.g. music or nature sounds.

Figure 4:
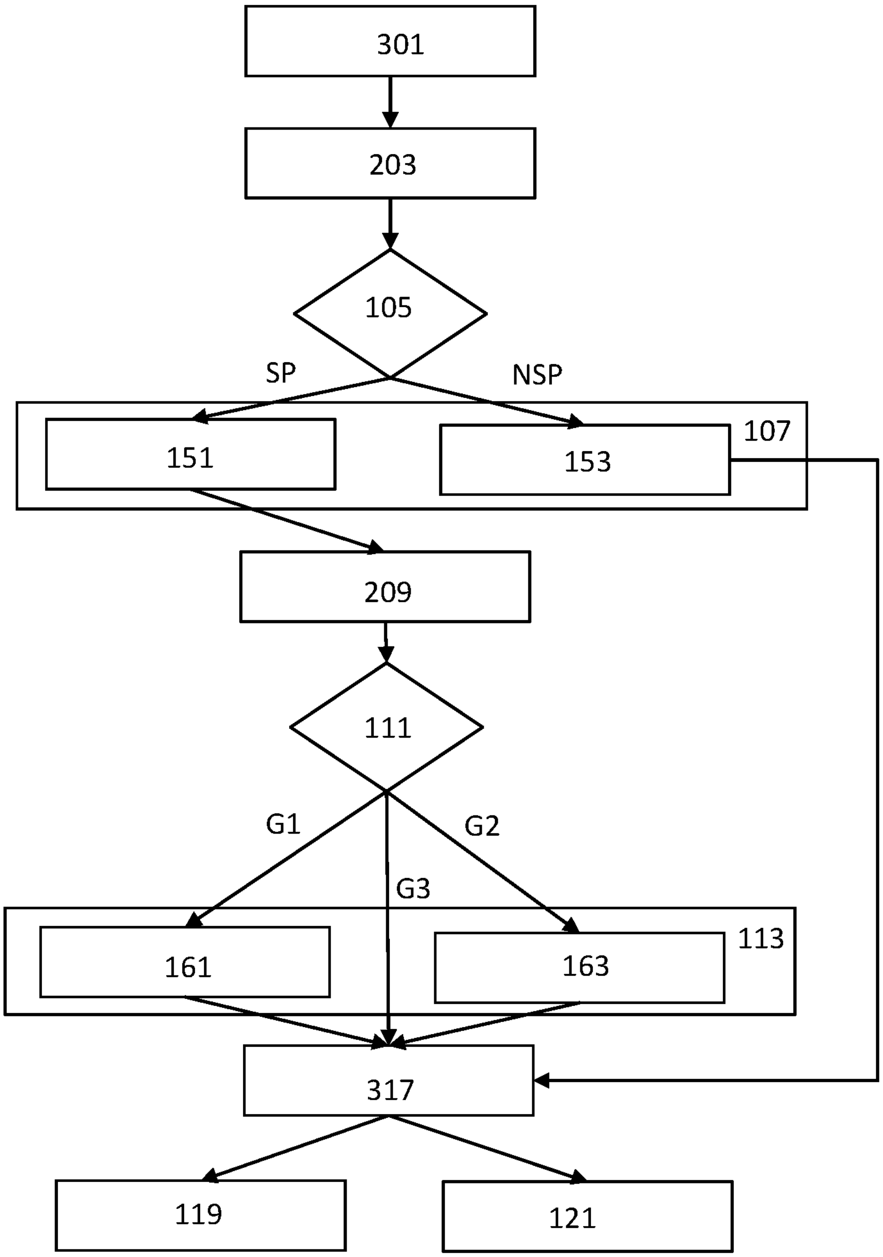
FIG. 4 is a flow diagram of a third embodiment of the method.

A third embodiment of the method is shown in FIG. 4. In the embodiment of FIG. 4, step 201 of FIG. 3 has been replaced with step 301, step 217 of FIG. 3 has been replaced with step 317, and step 115 of FIG. 3 has been omitted. Step 301 differs from step 201 in that the media content itself is no longer obtained, but only metadata relating to the media content is obtained. In addition to the information described in relation to FIG. 3, the metadata further comprises information extracted from the video portion and audio portion of the media content that allows light effects to be determined, e.g. colors extracted from the frames of the video portion or loudness/intensity information extracted from the audio portion. Since it is no longer necessary to analyze the media content to obtain this information, step 115 is omitted. Step 317 is similar to step 217 of FIG. 3 except that information obtained in step 301 is used to determine the one or more light effects and the one or more further light effects.

Figure 5:
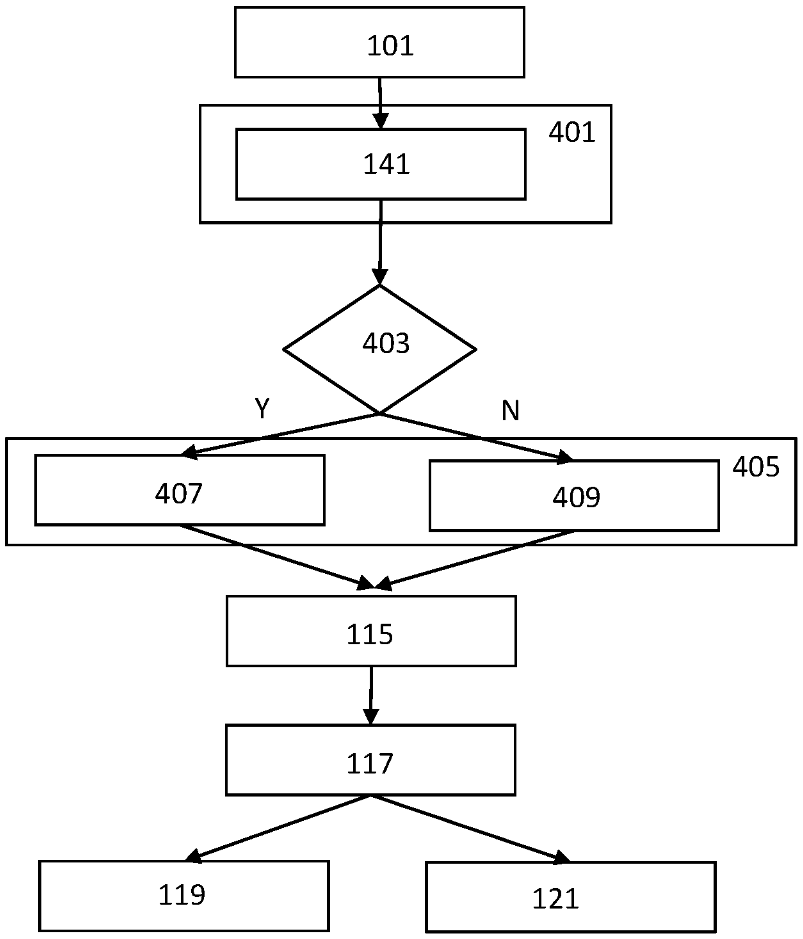
FIG. 5 is a flow diagram of a fourth embodiment of the method.

A fourth embodiment of the method is shown in FIG. 5. In the embodiment of FIG. 5, steps 103, 105, 107, 109, 111 and 113 of FIG. 2 have been replaced with steps 401, 403 and 405. Like step 103 of FIG. 2, step 401 of FIG. 5 comprises step 141, but step 401 does not comprise step 143 of FIG. 2. Thus, step 401 does not comprise classifying the speech in predominantly speech or predominantly non-speech. Step 141 comprises determining the amount of speech in the audio portion, e.g. using spectral analysis.

Step 403 comprises determining whether the amount of speech determined in step 141 exceeds a threshold. This threshold may be a percentage, for example. If this threshold is set to 50%, then this results in a determination whether the audio portion comprises predominantly speech or predominantly non-speech. However, the threshold may beneficially be set to a percentage lower or higher than 50%.

Step 405 is performed after step 403. Step 405 comprises sub steps 407 and 409. Step 407 is performed if it is determined in step 403 that the threshold has been exceeded. Step 409 is performed if it is determined in step 403 that the threshold has not been exceeded. Step 407 comprises determining a first extent. Step 409 comprises determining a second extent.

The first extent indicates a first speed of transitions between the plurality of light effects (i.e. a first dynamicity). The second extent indicates a second speed of transitions between the plurality of light effects. The second speed of transitions is higher than the first speed of transitions. Thus, light effects accompanying scenes containing more than a certain amount of speech are rendered using low dynamics, whereas light effects accompanying the same scene with less than this certain amount of speech, even though the audio portion of this scene may have an identical intensity and/or loudness, are rendered with higher dynamics.

Figure 6:
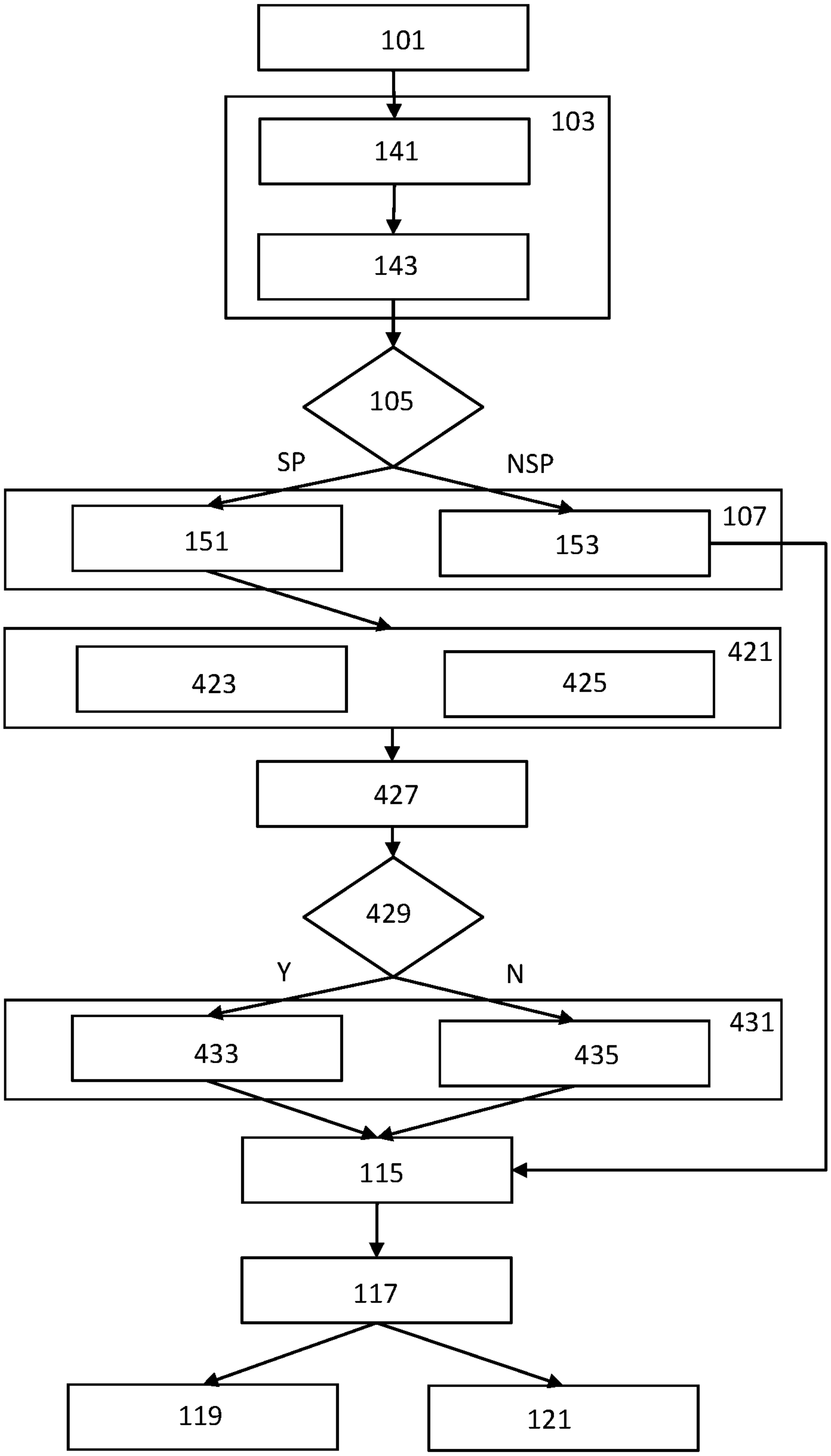
FIG. 6 is a flow diagram of a fifth embodiment of the method.

A fifth embodiment of the method is shown in FIG. 6. In the embodiment of FIG. 6, steps 109, 111 and 113 of FIG. 2 have been replaced with steps 421, 427, 429 and 431. In this fifth embodiment, not only the spectral content is taken into account, but a semantic analysis of the speech is performed as well. Step 421 is performed after step 151, which is performed if the audio portion is classified as predominantly speech. In step 421, spoken words are obtained. Step 423 comprises determining words spoken in the audio portion by recognizing the spoken words in the audio portion. Step 423 comprises obtaining the spoken words from subtitles associated with the media content. In an alternative embodiment, only one of steps 421 and 423 is performed.

In a step 427, the mood of the scene is determined from the spoken words determined in step 421. In step 429, is it determined whether the mood of the scene is emotionally charged or not. If the mood of the scene is emotionally charged, a higher speed of transitions between the plurality of light effects is selected as the extent in step 433. If the mood of the scene is not emotionally charged, a lower speed of transitions between the plurality of light effects is selected as the extent in step 435. Steps 433 and 435 are sub steps of step 431.

Figure 7:
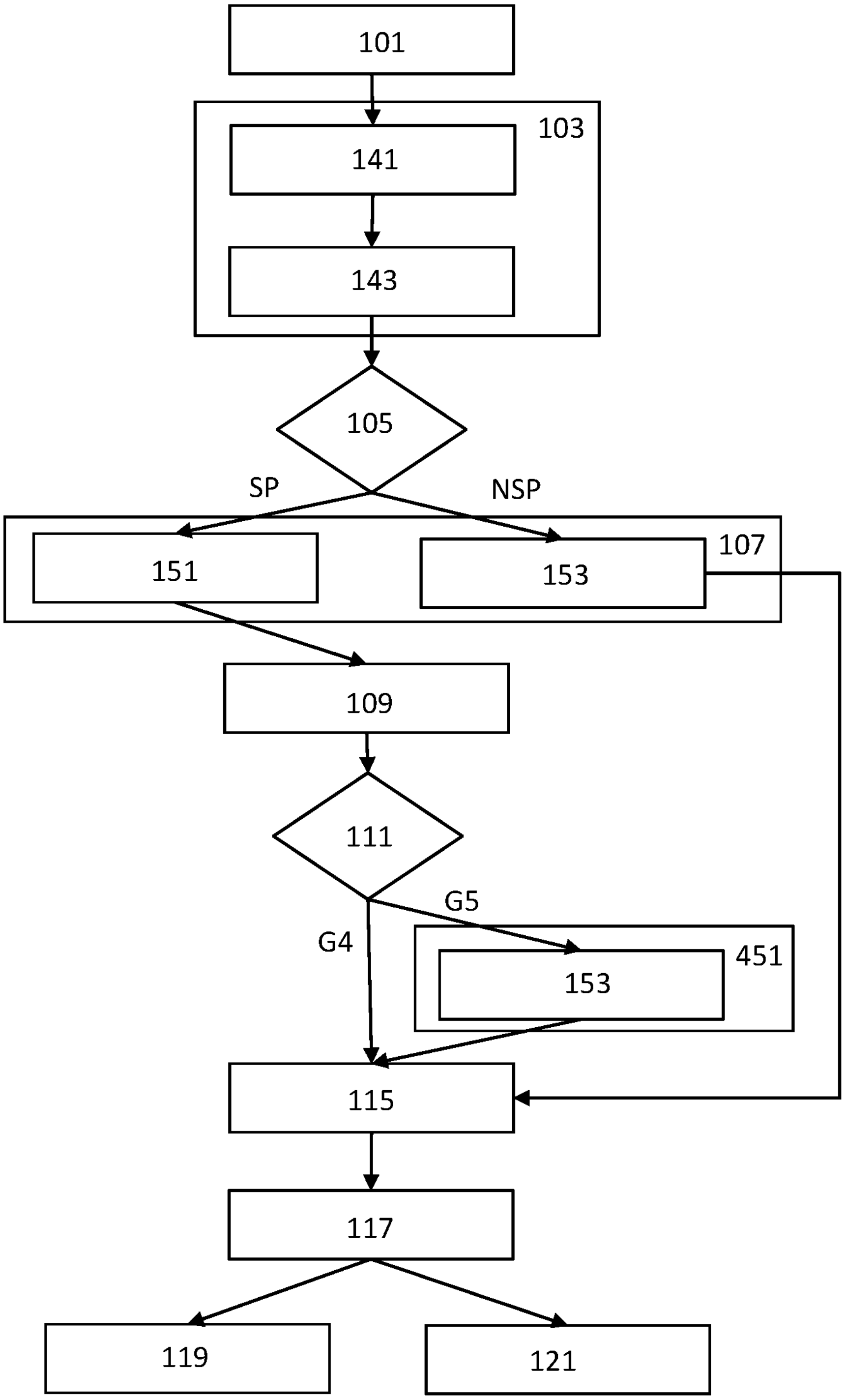
FIG. 7 is a flow diagram of a sixth embodiment of the method.

A sixth embodiment of the method is shown in FIG. 7. In the embodiment of FIG. 7, step 113 of FIG. 2 has been replaced with step 451. Step 111 comprises determining whether the audio portion has been classified as narration or singing or has been classified differently. If the audio portion has been classified as narration or singing (group 4), step 451 is performed. Step 153 is performed as sub step of step 451. Thus, the extent is determined as if the audio portion were classified as predominantly non-speech and normal light effects are applied. If the audio portion has been classified differently, e.g. as conversation or screaming (group 5), then the extent is not modified and step 115 is performed next.

Figure 8:
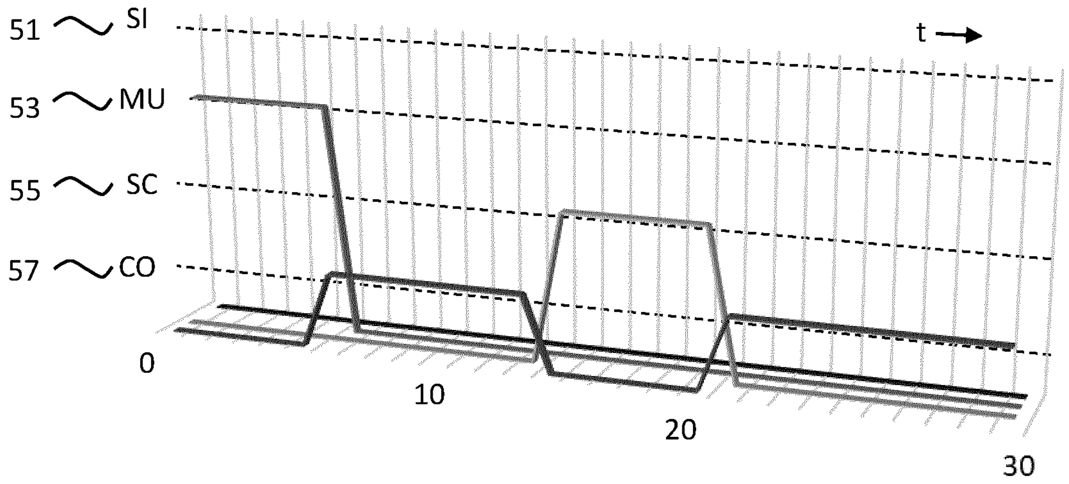
FIG. 8 shows an example of an audio classification of a first media item.

FIG. 8 shows an example of an audio classification of a first media content item, which is an episode of a TV series, in the form of a graph. Time is depicted along the x-axis of the graph. Four possible classes are shown along the y-axis of the graph. In the audio classification depicted in FIG. 8, audio portions with a duration of one second are classified. The graph shows which classes are detected over a period of 30 seconds. From one to six seconds, music class 53 is detected. From seven to fourteen seconds, conversation class 57 is detected. From fifteen to twenty seconds, screaming class 55 is detected. From twenty-one to thirty seconds, conversation class 57 is detected again. A singing class 51 is not detected in this audio portion. Based on these classifications, the time interval from 0 to 30 seconds can be classified as predominantly speech, as screaming and conversation are speech classes.

Figure 9:
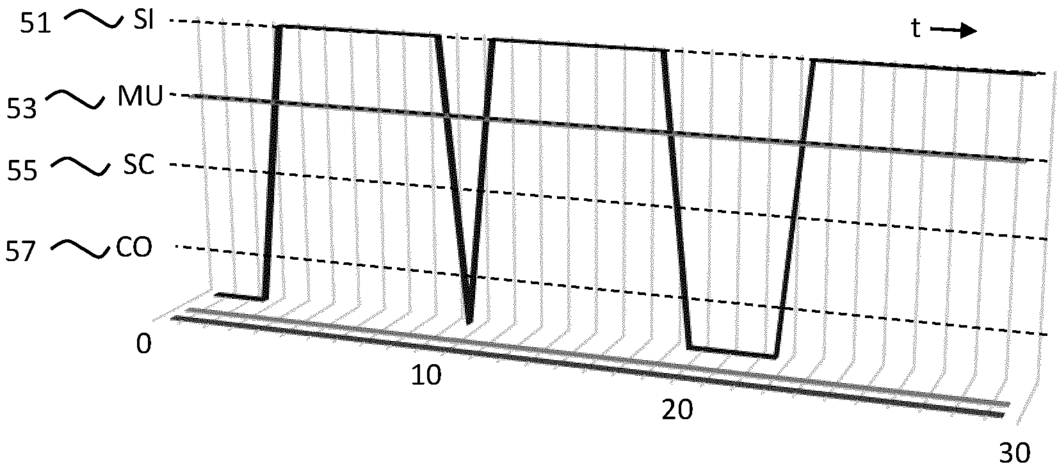
FIG. 9 shows an example of an audio classification of a second media item.

While in the example of FIG. 8, only one class is detected each second, multiple classes are detected at the same time in the example of FIG. 9. FIG. 9 shows an example of an audio classification of a second media content item, which is a music video clip, in the form of a graph. From 0 to 30 seconds, the music class 53 is detected. From 4 to 10 seconds, 12 to 18 seconds and 23 to 30 seconds, the singing class 51 is detected. Based on these classifications, the time interval from 0 to 30 seconds can be classified as predominantly non-speech, as the music class 53 is detected for 30 seconds and the singing class 51 is detected for 22 seconds.

Figure 10:
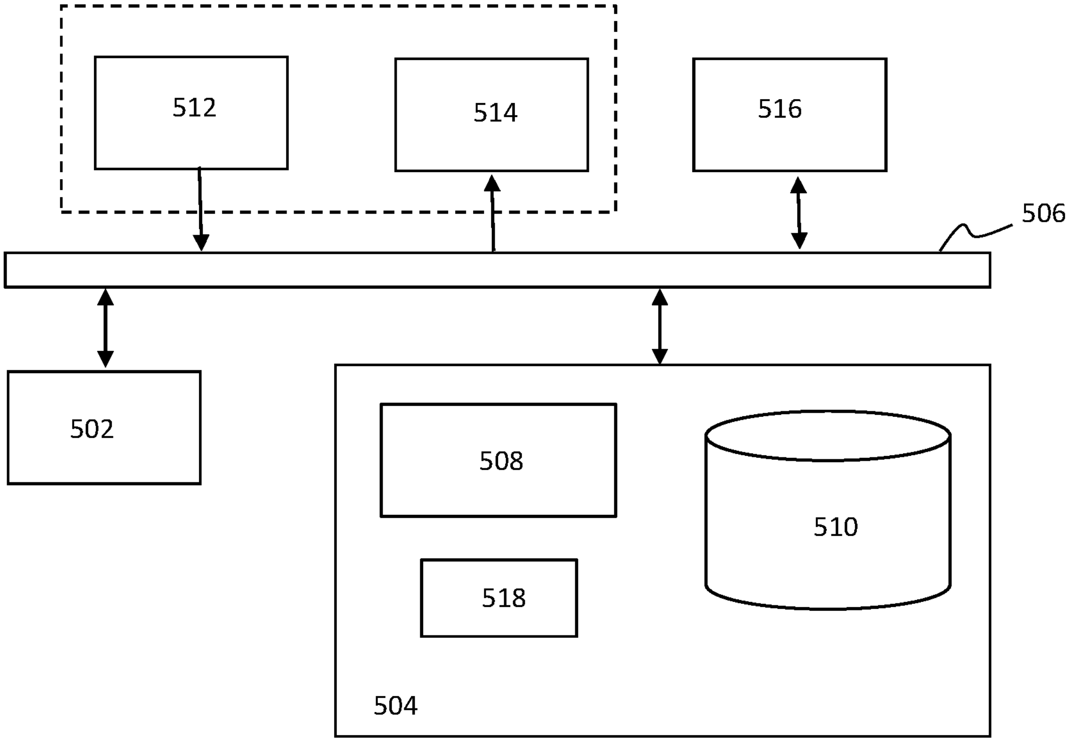
FIG. 10 is a block diagram of an exemplary data processing system for performing the method of the invention.

FIG. 10 depicts a block diagram illustrating an exemplary data processing system that may perform the method as described with reference to FIGS. 2 to 7.

As shown in FIG. 10, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that can perform the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the quantity of times program code must be retrieved from the bulk storage device 510 during execution. The processing system 500 may also be able to use memory elements of another processing system, e.g. if the processing system 500 is part of a cloud-computing platform.

Input/output (I/O) devices depicted as an input device 512 and an output device 514 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 300.

As pictured in FIG. 10, the memory elements 504 may store an application 518. In various embodiments, the application 518 may be stored in the local memory 508, the one or more bulk storage devices 510, or separate from the local memory and the bulk storage devices. It should be appreciated that the data processing system 500 may further execute an operating system (not shown in FIG. 10) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining one or more light effects to be rendered while media content is being rendered, said one or more light effects being determined based on an analysis of said media content, said system comprising:
at least one input interface;
at least one output interface; and
at least one processor configured to:
use said at least one input interface to obtain media content,
determine one or more light effects to be rendered on one or more light sources while said media content is being rendered, said one or more light effects being determined based on:
an analysis of an audio portion of said media content, and
an analysis of a video portion of said media content, and
use said at least one output interface to control said one or more light sources to render said one or more light effects,
obtain information indicating a degree of speech in said audio portion, said degree of speech being determined based on said analysis of said audio portion by determining an amount of speech in said audio portion and classifying said audio portion as predominantly speech or predominantly non-speech based on said amount of speech, said degree of speech in said audio portion being determined by classifying said audio portion as a class of a plurality of classes, said plurality of classes comprising at least two of: conversation, whispering, screaming, narration, singing, diegetic speech, and non-diegetic speech;
determine an extent to which said audio portion should be used to determine said one or more light effects, said extent being determined based on said determined degree of speech; and
determine a brightness and/or chromaticity of said one or more light effects based on an intensity and/or a loudness of said audio portion in dependence upon the determined extent to which said audio portion should be used to determine said one or more light effects.

2. A system as claimed in claim 1, wherein said at least one processor is configured to determine a first extent as said extent in dependence on said audio portion being classified as predominantly speech and determine a second extent as said extent in dependence on said audio portion being classified as predominantly non-speech, said second extent indicating that a brightness and/or chromaticity of said one or more light effects should be determined based on an intensity and/or loudness of said audio portion and said first extent indicating that a brightness and/or chromaticity of said one or more light effects should not be determined based on an intensity and/or loudness of said audio portion.

3. A system as claimed in claim 1, wherein said at least one processor is configured to determine said one or more light effects using a first brightness and/or chromaticity range in dependence on said audio portion being classified as predominantly speech and using a second brightness and/or chromaticity range in dependence on said audio portion being classified as predominantly non-speech, said first brightness and/or chromaticity range having a lower average brightness and/or chromaticity than said second brightness and/or chromaticity range.

4. A system as claimed in claim 1, wherein said at least one processor is configured to determine a first extent as said extent in dependence on said audio portion being classified as conversation and determine a second extent as said extent in dependence on said audio portion being classified as singing, said second extent indicating that a brightness and/or chromaticity of said one or more light effects should be determined based on an intensity and/or loudness of said audio portion and said first extent indicating that a brightness and/or chromaticity of said one or more light effects should not be determined based on an intensity and/or loudness of said audio portion.

5. A system as claimed in claim 1, wherein said one or more light effects comprise a plurality of light effects and said at least one processor is configured to determine a speed of transitions between said plurality of light effects in dependence on said class.

6. A system as claimed in claim 1, wherein said audio portion is classified by analyzing a spectral composition of said audio portion.

7. A system as claimed in claim 1, wherein said one or more light effects comprise a plurality of light effects and said at least one processor is configured to determine whether an amount of speech in said audio portion exceeds a threshold and determine a speed of transitions between said plurality of light effects in dependence on said amount of speech exceeding said threshold.

8. A system as claimed in claim 1, wherein said at least one processor is configured to determine words spoken in said audio portion by recognizing said spoken words in said audio portion and/or obtaining said spoken words from subtitles associated with said media content.

9. A system as claimed in claim 1, wherein said at least one processor is configured to determine said degree of speech by using subtitles associated with said media content and/or by focusing on a center channel in or obtained from said audio portion.

10. A lighting system comprising the system of claim 1 and one or more light sources.

11. A method of determining one or more light effects to be rendered while media content is being rendered, said one or more light effects being determined based on an analysis of said media content, said method comprising:
obtaining media content;
determining one or more light effects to be rendered on one or more light sources while said media content is being rendered, said one or more light effects being determined based on an analysis of an audio portion of said media content and an analysis of a video portion of said media content; and
controlling said one or more light sources to render said one or more light effects,
obtaining information indicating a degree of speech in said audio portion, said degree of speech being determined based on an analysis of said audio portion by determining an amount of speech in said audio portion and classifying said audio portion as predominantly speech or predominantly non-speech based on said amount of speech, said degree of speech in said audio portion being determined by classifying said audio portion as a class of a plurality of classes, said plurality of classes comprising at least two of: conversation, whispering, screaming, narration, singing, diegetic speech, and non-diegetic speech;

determining an extent to which said audio portion should be used to determine one or more light effects, said extent being determined based on said determined degree of speech; and wherein a brightness and/or chromaticity of said one or more light effects is based on an intensity and/or a loudness of said audio portion in dependence upon the determined extent to which said audio portion should be used to determine said one or more light effects.

12. A non-transitory computer readable medium comprising at least one software code portion or a computer program product storing at least one software code portion, the software code portion, when run on a computer system, being configured for enabling the method of claim 11 to be performed.

* * * * *